No. 649,113. Patented May 8, 1900.
E. G. SOLOMON.
CALCULATOR.
(Application filed Aug. 1, 1899.)
(No Model.)
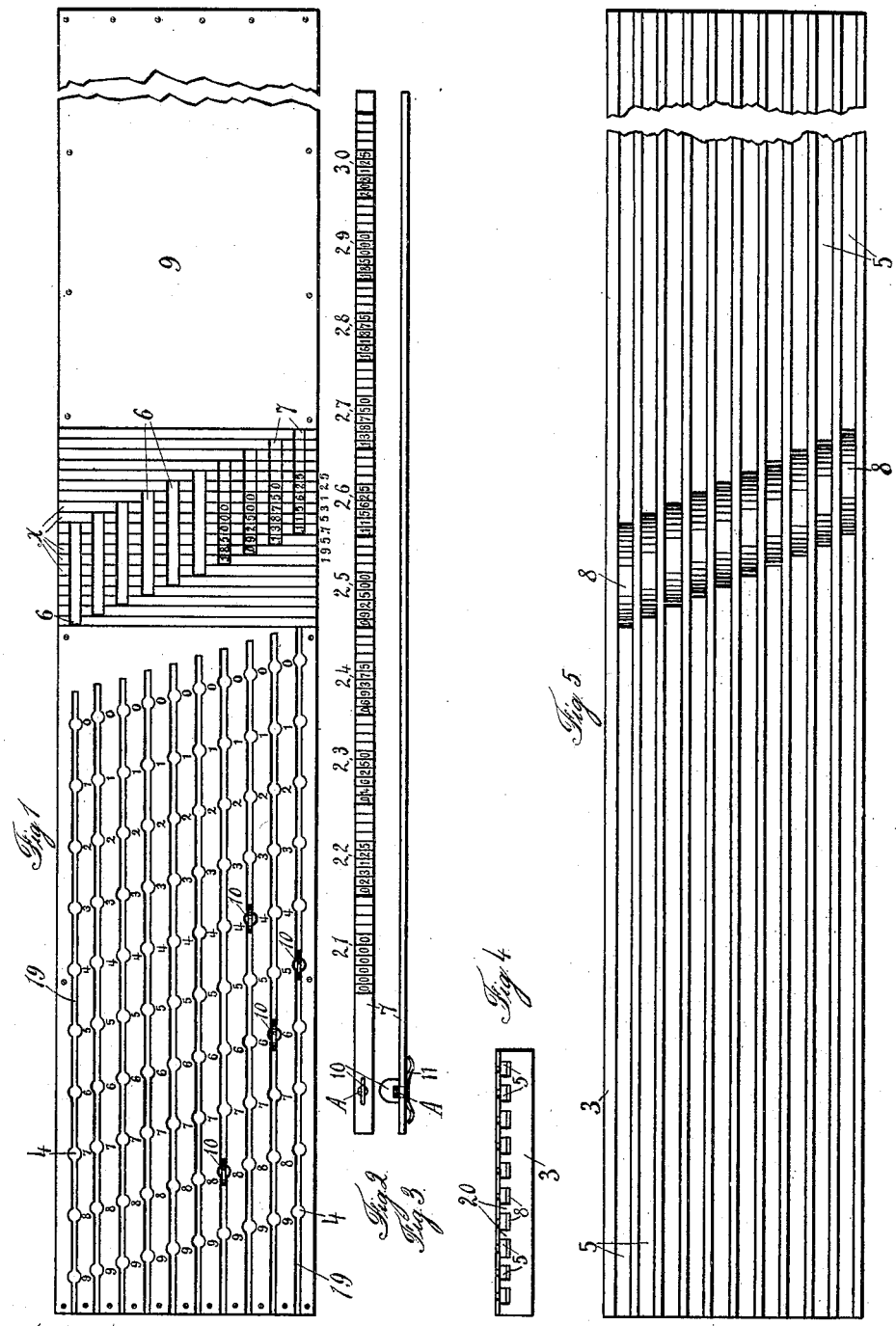
WITNESSES.
C. F. Patterson
W. R. Dodsworth
INVENTOR
Emmet G. Solomon
PER Geo. W. Sues
ATTORNEY.

UNITED STATES PATENT OFFICE.

EMMET G. SOLOMON, OF OMAHA, NEBRASKA.

CALCULATOR.

SPECIFICATION forming part of Letters Patent No. 649,113, dated May 8, 1900.

Application filed August 1, 1899. Serial No. 725,784. (No model.)

*To all whom it may concern:*

Be it known that I, EMMET G. SOLOMON, residing at Omaha, in the county of Douglas and State of Nebraska, have invented certain useful Improvements in Calculators; and I do hereby declare that the following is a full, clear, and exact description of the invention, such as will enable others skilled in the art to which it appertains to make and use the same, reference being had to the accompanying drawings, which form a part of this specification.

This invention relates to a simple improvement in calculators, and embodies a mechanical arrangement of instrumentalities by means of which mathematical problems involving multiplication may be solved by the simple process of addition, as will be described more fully hereinafter.

The aim of my invention is to provide a mechanical appliance by means of which mathematical problems in multiplication may be done by the simple process of addition.

In the accompanying drawings I have shown in Figure 1 a top view of a calculator embodying my invention. Fig. 2 shows a top view of one of the slides as used in my invention. Fig. 3 shows an edge view of said slide. Fig. 4 shows an end view of the receiver as used in my device, while Fig. 5 is a top view of the bottom portion of my invention.

My invention embodies, essentially, a base 3 of any suitable size or material, which base is provided with a plurality of upwardly-extending ribs 20, forming the channels 5, as is shown more clearly in Fig. 4, and these channels at one point are provided with an upwardly-extending portion 8, as is shown more clearly in Fig. 5, so as to form a rise within each channel. These rises or raised portions 8 are not necessary and, while convenient, may be eliminated, if desired. If used, however, these risers should be in a staggered position, inclining from the right toward the left, as is shown in Fig. 5. Closing these channels 5 is a top plate 9, which plate can be made of any suitable material, and this top plate is provided above each of the channels 5 with a slot 19, and these slots 19 are provided with a plurality of circular enlargements 4, as is clearly shown in Fig. 1. While all these slots 19 may be of a like length, it is necessary that the enlargements 4 be in a staggered position, inclining upward from right to left, so that each one of these enlargements 4 comes a suitable distance above and to the left of the enlargement below it. At a suitable point within this upper plate 9 are a series of stub slots or openings 6, there being one opening for each of the slots 19 mentioned, and one of these stub-slots 6 comes in alinement with one of the slots 19, as is shown in Fig. 1. These stub-slots again are in a staggered position, and the field or portion of plate 9 adjacent to these stub-slots 6 is divided into a succession of sections. A plurality of lines $x$ are marked upon this plate 9, so that each stub-slot 6 can be readily divided into ten imaginary fields, each slot further, however, beginning one field to the right and extending one field beyond, as will be understood in referring to Fig. 1. In connection with this "receiver," as I prefer to call the structure so far described, I use a plurality of scales 7, and these scales are divided into certain divisions in series, there being ten spaces within each field, as will be understood on referring to Fig. 2, where the first field is marked 21, the second 22, the third 23, and so on, and it will be noted that the field 21 is divided into ten sections, in the first six of which are naughts, while the six fields of the second division 22 are provided with the following figures: "023125." The scale here shown is tabulated to be used in connection with a tax-assessment at the rate of twenty-three and one-fourth ($23\frac{1}{4}$) mills upon the dollar. The figures just mentioned represent the tax at the rate of twenty-three and one-fourth ($23\frac{1}{4}$) mills upon the dollar. The next group of figures, "046250," represent the tax at the above rate upon two dollars, and so on, the seventh, for instance, being provided with the numbers "1, 3, 8, 7, 5, 0," being the tax at the rate of twenty-three and one-fourth mills upon six dollars. It will further be noted that the decimal point is in front of the first figure in each field. These numerical tables or tables of values are carefully placed upon these slides after they have been compiled by a skilled mathematician. Each of these slides 7, it will be noted, is further provided with an upwardly-extending disk A of a size so that it will readily fit into one of the circular openings 4, while below each one of these disks A is a spring 11, while extending from each slide 7 is an operating-button 10. These slides are adapted to nicely work in the grooves 5, and the upwardly-extending portions 8 within the grooves 5 are adapted to come immediately below the stub-slots 6, so that the slides 7 pass over these raised portions 8 to come nearer against the top plate 9, this upward holding of the slides 7 being merely a matter of convenience.

Now these calculators are supposed to be sold with a certain set of slides 7, and these slides, as has been set forth, may be provided with certain tables of values. The figures upon each slide of course being especially arranged for the work to be accomplished, as by means of my device, an operator may arrive at the value of any commodity that is priced by the ton or bushel, for instance, and saves the operator the trouble of reducing the weight to tons or bushels, and gives the value, if the weight is known, by the simple process of addition, thereby avoiding the necessity, as has been set forth, of reducing the quantities to tons or bushels. By means of the same simple process the area, if known in feet, can be instantly reduced to acres through the simple process of addition.

To disclose the operation of my device, I will assume that the operator is a public official and is required to prepare a table showing what each tax-payer has to pay because of a certain levy ordered. I will assume that the levy ordered is of twenty-three and one-eighth mills and the value of the property against which the levy is ordered is eight thousand four hundred and sixty-five dollars. The question is, how much tax at a levy of twenty-three and one-eighth mills the owner of eight thousand four hundred and sixty-five dollars worth of property will have to pay. In the first place, the operator is provided with a series of slides provided with a tabulator or table of values especially compiled for a problem in which the factor would be twenty-three and one eighth mills. If the levy were to be an even twenty-four mills, a separate set of slides would be used. However, in the present problem we are to find the amount necessary, and so insert—beginning, preferably, from the bottom—a plurality of slides 7, all of which are alike and are provided with the tables, as disclosed in Fig. 2. Now it will be noticed that the first number of the slide 7, as is shown in Fig. 2, beginning at the right, is "5." This being the case, the operator depresses the button 10 downward and slides the same to the left until the connected disk A finds a seating within the enlargement marked 5, it having been noticed that each of these enlargements 4 is identified by a number beginning at "0" and going to the left and ending at "9." The next number in our valuation being a "6," the second slide is grasped until its disk A is carried into the sixth opening, where it is locked. The third slide has its button carried forward until the disk locks within the opening marked 4, because the third number in the valuation is figure "4," while the next slide is carried to the left until the disk A works into the eighth opening, because the last numeral in the valuation is represented by the figure "8," so that while the valuation is eight thousand four hundred and sixty-five dollars the first button from above was in the eighth opening, the second in the fourth, the third in the sixth, and the fourth in the fifth. This would show within the first stub-slot 6 the following figures: "115625," being the division marked 26 upon the slide 7. The second figures exposed in the second stub-slot would be "138750," the "1" being one division to the left of the numeral "1" within the stub-slot below, so that the "3" would come above the "1." In the next field above will be disclosed the following numbers: "092500," as disclosed upon the fifth field of the slide 7, while the upper numerals disclosed would be "185000," these numbers being those upon the field marked 29 of the slide 7. Now in simply adding these figures the result would be as follows: "195.753125," the decimal point being determined by the location of the first decimal point encountered in front of the figures upon the first slide. From this the property-owner would be expected to pay one hundred and ninety-five dollars and seventy-five cents, in round numbers. From this it would be noticed that all operations of multiplication have been eliminated, and the proposition has resolved itself into a simple one of addition. The buyer of corn, for instance, would be provided with a special set of slides calculated for his business, while a lumber-dealer would be provided with still another set of slides which have been especially calculated with a view relating to lumber-figures. If a person was running a grain-elevator and was buying corn, say, at thirty-two and one-half cents per bushel, the various slides in the calculator would each have the following table of figures: No. 1, ".00000000;" No. 2, value of one pound, ".00464286;" No. 3, value of two pounds, ".00928572;" No. 4, value of three pounds, ".01392858;" No. 5, value of four pounds, ".01857144;" No. 6, value of five pounds, ".02321430;" No. 7, value of six pounds, ".02785716;" No. 8, value of seven pounds, ".03250002;" No. 9, value of eight pounds, ".03714288;" No. 10, value of nine pounds, ".04178574." Suppose that a load of corn weighed two thousand three hundred and sixty-five pounds. He would move his bottom button on slide to station 5, his second button to station 6, his third button to station 3, his fourth button to station 2, and by adding the sums together, pointing off where the decimal appears in bottom slide, he would have the total value of two thousand three hundred and sixty-five pounds of corn at thirty-two and one-half cents per bushel, as follows:

```
Station No. 2,  .00928572
Station No. 3,  .01392858
Station No. 6,  .02785716
Station No. 5,  .02321430
                ──────────
               10.98036390
``` which would be ten dollars and ninety-eight cents. Now if the market would change and corn was at thirty-three and one-half cents per bushel, he would have to arrange a new set of slides.

Having thus described my said invention, what I claim as new, and desire to secure by United States Letters Patent, is—

1. The combination with a suitable holder provided with a field divided into sections in a staggered position, a plurality of slides provided with a table of values adapted to be used in connection with said staggered sections, an indicator or button on each slide, and a plurality of scales, there being one scale for each of said staggered fields, said indicators being adapted to be brought in proximity to the graduations of said scales, as and for the purpose set forth.

2. The combination with a holder divided into a plurality of fields in a staggered position inclining toward the left, said holder further being provided with a plural series of openings numbered from "0" to "9," each opening being identified by a numeral one unit higher than the preceding one, there being a series of openings for each single staggered field and a plurality of slides, each slide being provided with a projecting pin adapted to work into one of said series-openings, said slides being provided with certain tables of values, said tables of values being adapted to come within said fields in a staggered position.

EMMET G. SOLOMON.

In presence of—
C. L. HARRIS,
W. G. TEMPLETON.